Jan. 8, 1935.   J. W. BELL   1,987,319
ROTOR FOR MEASURING DISPENSERS
Filed Sept. 29, 1933
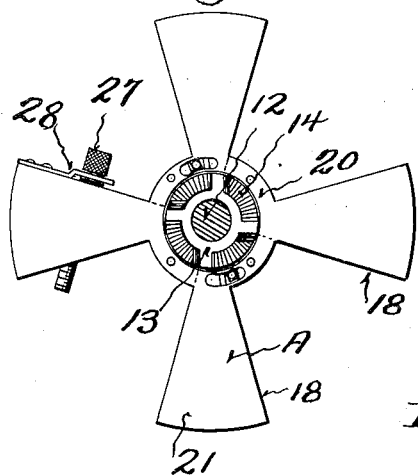
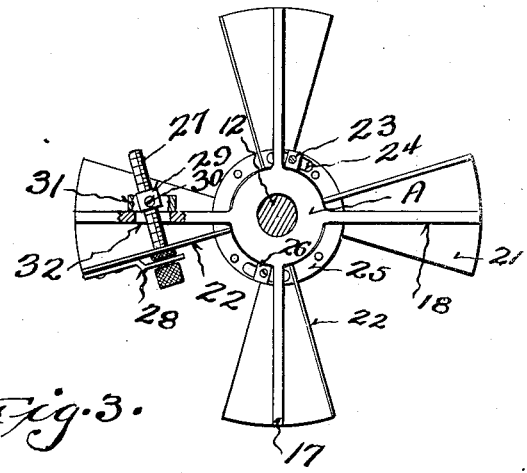
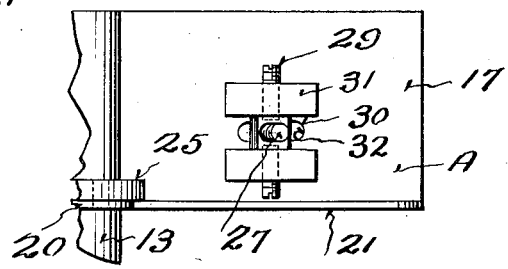
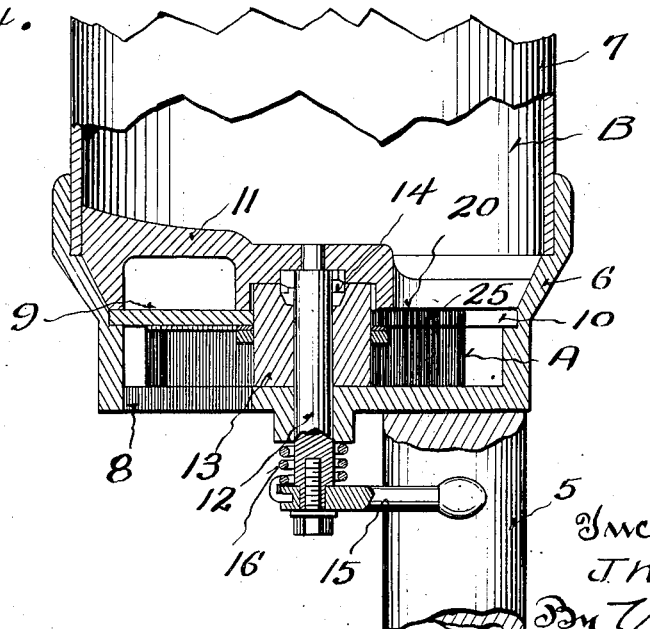
Inventor
J. W. Bell
By
Attorneys Patented Jan. 8, 1935

1,987,319

UNITED STATES PATENT OFFICE 1,987,319

ROTOR FOR MEASURING DISPENSERS

John W. Bell, Chicago, Ill.

Application September 29, 1933, Serial No. 691,485

1 Claim. (Cl. 221—109)

This invention appertains to machines utilized for dispensing a measured quantity of material, such as pulverized coffee, malted milk, sugar, etc., and has for one of its primary objects the provision of novel means for forming the measuring device, whereby different quantities of material can be served from the machine to suit the varying needs of the owner of the machine and in accordance with the kind of material being dispensed.

In all dispensing machines, with which I am familiar, the machines are built to dispense one specified amount of material on each operation of the machine. This amount cannot be varied irrespective of the purpose for which the machine is used. Consequently, these machines are limited in their use.

Another salient object of my invention is the provision of novel means for constructing the dispensing rotor of the machine, so that the size of the measuring pockets can be accurately adjusted, so that different quantities of material can be dispensed to suit individual requirements.

A further important object of my invention is the provision of a measuring rotor, which is particularly adapted for use in that type of machine shown in my pending application, Serial No. 630,603, filed July 15, 1933, but which is susceptible for use in all types of measuring machines embodying a rotating measuring wheel.

A further important object of my invention is the provision of a dispensing machine for powder and like material embodying a rotatable measuring wheel having measuring pockets with means associated directly with said wheel for varying the active size of the pockets, so that the measuring wheel can be definitely set to measure any particular quantity of material preferred.

With these and other objects in view, the invention consists in the novel construction, arrangement and formation of parts, as will be hereinafter more specifically described, claimed and illustrated in the accompanying drawing, in which:—

Figure 1 is a top plan view of my improved measuring rotor or wheel, the operating shaft therefor being shown in section.

Figure 2 is a bottom plan view of the rotor or wheel with parts thereof broken away and in section to illustrate structural details, the operating shaft therefor being shown in section.

Figure 3 is an enlarged fragmentary detail side elevation of the measuring rotor showing the means employed for adjusting the active size of the measuring pockets, the wheel or rotor being shown in an inverted position.

Figure 4 is a fragmentary side elevation of a measuring machine with parts thereof broken away and in section illustrating my improved measuring rotor or wheel incorporated therewith.

Referring to the drawing in detail, wherein similar reference characters designate the corresponding parts throughout the several views, the letter A generally indicates my improved measuring rotor or wheel and B a dispensing machine with which the same can be utilized.

The dispensing machine B can be of the same type as that shown in my co-pending application heretofore mentioned, or the rotor can be associated with any other preferred or desired type of dispensing machine.

As shown, the machine B comprises a supporting standard 5 for supporting a hollow base 6. This base 6 receives the storage vessel, container or hopper 7, the lower end of which is open, so that the material therein can flow into the base 6. The container or hopper 7 is preferably formed of a transparent material, so that the substance contained therein can be readily seen by observers. The lower end of the base 6 is provided with an outlet opening 8 adjacent to its front end and the rotor A with its measuring pockets, as will be later described, sweeps past this opening 8.

Arranged above the measuring rotor A is a partition plate 9 and this plate 9 is provided at a point diametrically opposite the opening 8 with an inlet opening 10 and the rotor is confined between the bottom wall of the base and the partition plate 9. Rotatably mounted above the partition plate 9 is the agitator 11 and the same extends partially into the hopper 7.

Rotatably and slidably carried by the axial center of the bottom wall of the base 6 is the operating shaft 12 and this shaft also slidably and rotatably extends through the hub 13 of the measuring rotor or wheel A. The upper end of the shaft is rigidly secured, such as by means of a suitable key, to the agitator 11 and the agitator 11 is coupled through the medium of ratchet teeth 14 with the hub of the measuring rotor. An operating handle is provided for the operating shaft and this handle is arranged below the base for convenient operation by the user. An expansion coil spring 16 is placed about the shaft 12 and has its opposite ends connected respectively to the base and handle 15. This spring serves the dual function of normally holding the ratchet teeth 14 of the agitator 11 and the hub 13 in engagement with one another and to normally hold and return the handle 15 and the agitator 11 to a predetermined position.

Referring more particularly to my improved rotor A, the same embodies the hub 13, as specified, and radiating from the hub 13 are a plurality of equidistantly spaced flat arms or blades 17. In the present instance, I have shown the wheel provided with four blades and thus, four measuring pockets 18 are provided between said blades; but obviously, the measuring rotor can be provided with any preferred number of blades.

When it is desired to dispense a measured quantity of the material, the handle 15 is rotated, say to the left (see Figure 4). This will turn the agitator 11 and the measuring rotor will be turned therewith in view of the ratchet teeth 14. One of the measuring pockets will then sweep past the outlet opening 8. Upon release of the handle, the spring 16 will return the agitator to its normal position and the agitator will ride up on the ratchet teeth of the hub and over the same. Thus, the dispensing rotor will remain stationary, but the agitator will be moved up and then back to its normal position.

By this arrangement, it can be seen that an oscillatory movement is imparted to the agitator and that the measuring rotor is advanced in the same direction at all times in a step-by-step movement. This particular construction has been described in detail in my pending case above referred to.

As brought out in the objects, the salient feature of the present invention is the fact that the active size of the measuring pockets 18 can be varied, so as to accurately dispense the desired amount of material from the hopper. This means comprises an annular hub ring 20 having formed thereon the radially projecting sector-shaped flat blades 21, which are arranged in a horizontal plane and at right angles to the blades or arms 17 of the rotor A. Formed on one longitudinal edge of each of the sector-shaped blades 21 is a depending wall or flange 22 which is of the same height as the measuring arms 17. The sector-shaped blades 21 ride over the upper edges of the measuring arms 18 and the sector-shaped blades are adapted to be rotated with their hub for moving the walls or flanges 22 toward and away from their adjacent arms 17.

Obviously, by moving the walls 22 closer to or further away from their adjacent blades or arms 17, the active size of the measuring pockets 18 will thus be made larger or smaller. The space between the walls or flanges 22 and arms 17 will be covered by the sector shaped blades 21 and thus, the flow of material into this space will be prevented.

To limit the rotary movement of the sector-shaped blades 21 and their walls 22 on the measuring rotor, pins 23 are provided which operate in slots 24 formed in the annular hub 20, and a reinforcing ring 25 therefor. These pins 23 are carried by arms 26 which can be formed on the hub 13 of the said measuring rotor or wheel.

Any desired means may be employed for adjusting the sector-shaped blades 21 and as shown, I have provided a rotatable feed screw 27, the head of which can be rotatably carried by a bracket 28 riveted or otherwise secured to one of the walls or flanges 22 of the sector-shaped blades 21. This screw is received within a nut 29 pivotally carried by pins 30 mounted in lugs 31 formed on the adjacent measuring arm or blade 17. This blade or arm 17 is provided with a slot 32 for receiving the feed screw so as to compensate for movement of the screw incident to the adjustment of the measuring pocket adjusting means.

By turning the screw, the annular hub ring 20 and the sector-shaped wings 21 with the walls 22 can be rotated on the measuring rotor and thereby bring about the adjustment of the active size of the measuring pockets 18.

From the foregoing description, it can be seen that an exceptionally simple and durable means has been provided for varying the capacity of the measuring pockets, so that the desired amount of material can be accurately dispensed.

Changes in details may be made without departing from the spirit or the scope of this invention, but what I claim as new is:—

In a measuring and dispensing machine, a base, a measuring rotor rotatably carried by the base, means for operating said rotor, said rotor including a hub and a plurality of radially extending arms defining measuring pockets therebetween, means for varying the active size of said measuring pockets, said means including an annular hub ring and radially extending sector-shaped blades engaging over the top edges of said arms, depending walls carried by one longitudinal edge of each blade for movement toward and away from an adjacent face of the arms, and means for turning the hub ring, blades and walls on said rotor, said means including a feed screw rotatably carried by one wall and a feed nut pivotally carried by one arm receiving said feed screw.

JOHN W. BELL.